(No Model.)

A. B. BRYANT.
POTATO DIGGER.

No. 491,981. Patented Feb. 21, 1893.

WITNESSES.
J. W. Hartnett
B. W. Williams

INVENTOR
Alden B. Bryant,
By his Atty.
Henry Williams

THE NORRIS PETERS CO., PHOTO-LITHO., WASHINGTON, D. C.

UNITED STATES PATENT OFFICE.

ALDEN B. BRYANT, OF BOSTON, MASSACHUSETTS, ASSIGNOR OF ONE-HALF TO HARRES WOLF, OF SAME PLACE.

POTATO-DIGGER.

SPECIFICATION forming part of Letters Patent No. 491,981, dated February 21, 1893.

Application filed October 5, 1892. Serial No. 447,900. (No model.)

*To all whom it may concern:*

Be it known that I, ALDEN B. BRYANT, a citizen of the United States, residing in Boston, in the county of Suffolk and State of Massachusetts, have invented new and useful Improvements in Potato-Diggers, of which the following is a specification.

This is a device or implement for digging potatoes from the rows or hills, and shaking the earth from them preparatory to depositing them upon the surface of the ground or in any suitable receptacle.

Figure 1:
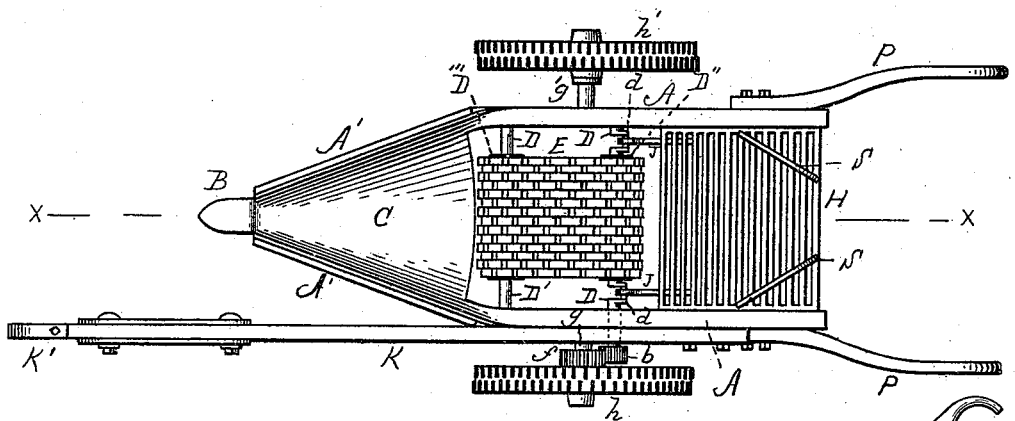
Figure 2:
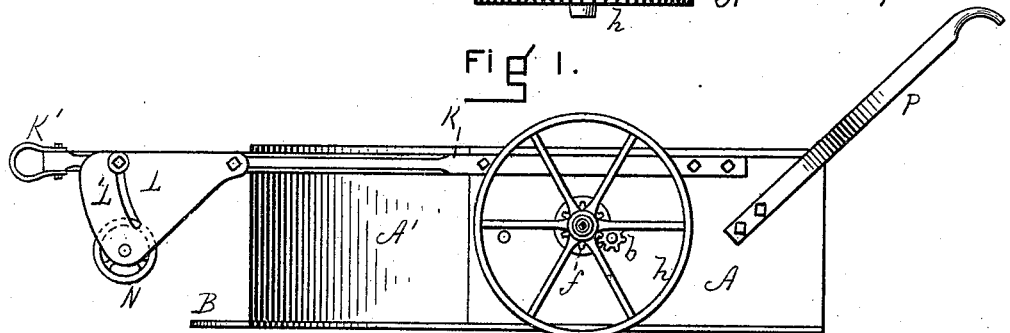
Figure 3:
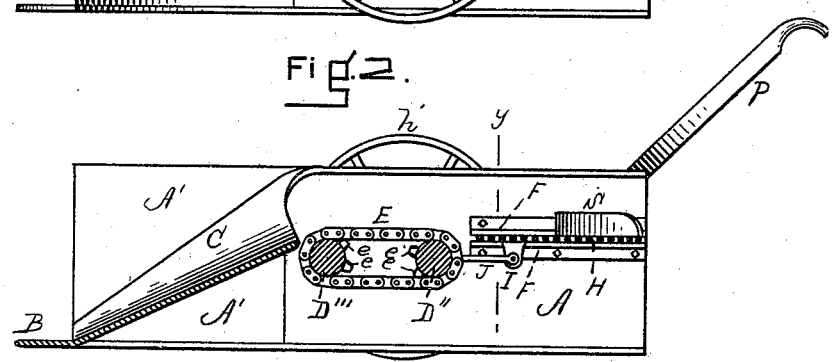
Figure 4:
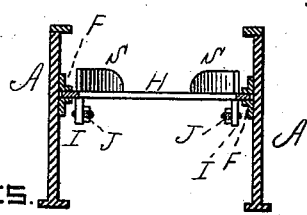
Figure 5:
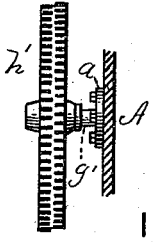

The nature of the invention is fully described below, and illustrated in the accompanying drawings, in which, Figure 1 is a plan view of my invention. Fig. 2 is a side elevation of the same. Fig. 3 is a vertical section on line $x$, Fig. 1. Fig. 4 is a cross vertical section on line $y$, Fig. 3. Fig. 5 is a sectional detail showing the manner in which the wheel is attached to the frame.

Similar letters of reference indicate like parts.

A A represent the two vertical parallel sides which converge at A' as shown. From the lower portion of the front end of the part A' a digger or plow B projects horizontally, and from this plow B a concave or hollowed out graduated trough C extends at the angle shown, up to the point at which the portions A' and A of the frame meet. This trough C fills all the space between the graduated sides A'.

D D' are shafts whose ends are supported in the sides A, the shaft D being provided with cranks $d$. These shafts support rolls D'' D''' which are furnished with sprockets $e$, as shown in Fig. 3. The shaft D extends at one end through the side A and has fast upon it the gear-wheel $b$, which is engaged by the gear-wheel $f$ fast upon the shaft $g$, upon which is also fast the driving wheel $h$; $h'$ being the driving wheel on the opposite side, and $g'$ its axle. The axle $g'$ and shaft $g$ do not extend through the frame, but have their bearings in suitable plates $a$, secured to the outer surfaces of the sides A as shown in Fig. 5.

E is an endless apron composed of numerous chains secured together or placed next each other, said apron being placed upon the rolls D'' and D''' and having motion imparted to them by the sprockets $e$.

H is a horizontally vibrating or reciprocating grate sliding in horizontal grooves or ways F on the inner sides of the side pieces A. By means of brackets I, (Fig. 3,) connecting rods J connect said grate with the cranks $d$.

K is a shaft extending from the frame of the machine on one side and provided with suitable means K' for attaching a horse thereto, and also with an adjustable plate L, slotted at L' and furnished with a wheel N, not new in this invention, whereby the depth or distance below the surface of the ground to which the plow B penetrates is regulated.

In operation, as the implement is drawn over the ground, guided by the handles P, the potatoes are dug by the projecting blade or plow B and, with the earth clinging to them, move up the trough C onto the chain apron or belt E, which is in constant motion toward the rear by reason of the intermediate gear $f$ $b$ and shaft D actuated by the driving wheel $h$. The chain belt carries the potatoes onto the vibrating grate or agitator H, where they are shaken by means of the cranks $d$ and connecting rods J, and the earth is by this means removed and dropped through the grate to the ground. The potatoes as they are shaken, gradually work toward the rear and are guided by the horizontal bars S so as to drop off centrally from the rear edge onto the ground or into a suitable receptacle.

Having thus fully described my invention, what I claim, and desire to secure by Letters Patent, is—

The herein described improved potato digger, consisting essentially of the frame A A', plow B, trough C, endless apron E composed of numerous chains secured closely together so as to constitute practically an integral apron or belt, shafts D D' supported in the sides A, said shaft D being provided with the cranks $d$, rolls D'' D''' provided with sprockets for engagement with the endless apron, shafts $g$ $g'$ provided with the wheels $h$ $h'$, gear-wheels $f$ $b$ on the shafts $g$ D respectively, connecting rods J, vibrating grate H reciprocating in the ways F, shaft K, adjustable slotted plate L and wheel N, substantially as set forth.

ALDEN B. BRYANT.

Witnesses:
HENRY W. WILLIAMS,
J. M. HARTNETT.